(12) United States Patent
Kumar

(10) Patent No.: US 10,192,061 B2
(45) Date of Patent: Jan. 29, 2019

(54) METHOD AND A COMPUTING DEVICE FOR PROVIDING PRIVACY CONTROL IN A SURVEILLANCE VIDEO

(71) Applicant: Wipro Limited, Bangalore (IN)

(72) Inventor: Kodavalla Vijay Kumar, Bangalore (IN)

(73) Assignee: Wipro Limited, Bangalore (IN)

( * ) Notice: Subject to any disclaimer, the term of this patent is extended or adjusted under 35 U.S.C. 154(b) by 58 days.

(21) Appl. No.: 15/461,093

(22) Filed: Mar. 16, 2017

(65) Prior Publication Data

US 2018/0211050 A1 Jul. 26, 2018

(30) Foreign Application Priority Data

Jan. 24, 2017 (IN) .............................. 201741002736

(51) Int. Cl.
*G06F 21/00* (2013.01)
*G06F 21/60* (2013.01)
(Continued)

(52) U.S. Cl.
CPC ............ *G06F 21/602* (2013.01); *G06F 21/31* (2013.01); *G06K 9/00718* (2013.01);
(Continued)

(58) Field of Classification Search
CPC ... G06F 21/602; G06F 21/31; G06K 9/00718; G06K 9/00771; G06K 9/2081; H04N 7/183; H04N 7/18; H04L 2209/04; G08B 13/196
See application file for complete search history.

(56) References Cited

U.S. PATENT DOCUMENTS 6,877,137 B1 * 4/2005 Rivette ............ G06F 17/30876
707/E17.112
8,929,545 B2 1/2015 Kim et al.
(Continued)

FOREIGN PATENT DOCUMENTS

JP  2003-046745  2/2003
JP  2005-286468  10/2005

OTHER PUBLICATIONS

Carrillo, P., et al., "*Research Article*; Compression Independent Reversible Encryption for Privacy in Video Surveillance", *ERASIP Journal on Information Security*, 2009, 13 pages.
(Continued)

*Primary Examiner* — Ghodrat Jamshidi
(74) *Attorney, Agent, or Firm* — Finnegan, Henderson, Farabow, Garrett & Dunner, LLP

(57) ABSTRACT

Method and a computing device for providing privacy control in a surveillance video is disclosed. The computing device receives a surveillance video from a video capturing. The computing device also receives an authentication input key from a user of the computing device. Based on the authentication input key, the computing device identifies one or more region of interests (ROIs) in the video surveillance. The identified ROIs are masked by the computing device for providing the privacy control. In the present disclosure, the number of privacy levels achievable are unlimited and not fixed by ROIs at the video capturing device end. The increase in number of privacy levels do not require any changes or complexity/power increase in the video capturing device end and doesn't demand for increase in bandwidth from the video capturing device. Further, it doesn't deteriorate the video quality.

19 Claims, 5 Drawing Sheets

(51) Int. Cl.
    *G06F 21/31*     (2013.01)
    *G06K 9/00*     (2006.01)
    *G06K 9/20*     (2006.01)
    *H04N 7/18*     (2006.01)
    *G08B 13/196*     (2006.01)

(52) U.S. Cl.
    CPC ....... *G06K 9/00771* (2013.01); *G06K 9/2081* (2013.01); *G08B 13/196* (2013.01); *H04N 7/18* (2013.01); *H04N 7/183* (2013.01); *H04L 2209/04* (2013.01)

(56) References Cited

U.S. PATENT DOCUMENTS

| | | | |
|---|---|---|---|
| 9,058,523 B2* | 6/2015 | Merkel | G06K 9/00771 |
| 2005/0117023 A1* | 6/2005 | Seo | H04N 5/232 |
| | | | 348/207.99 |
| 2005/0129272 A1 | 6/2005 | Rottman | |
| 2008/0117295 A1* | 5/2008 | Ebrahimi | G08B 13/19604 |
| | | | 348/143 |
| 2011/0145574 A1* | 6/2011 | Ju | H04N 7/181 |
| | | | 713/166 |
| 2016/0050341 A1* | 2/2016 | Erdler | H04N 1/444 |
| | | | 380/245 |
| 2016/0055343 A1* | 2/2016 | Coard | G06F 21/31 |
| | | | 726/7 |
| 2018/0033151 A1* | 2/2018 | Matsumoto | G06T 7/20 |
| 2018/0189505 A1* | 7/2018 | Ghafourifar | G06F 21/602 |

OTHER PUBLICATIONS

Extended European Search Report issued in the European Patent Office in counterpart European Application No. 17163912.3, dated Oct. 4, 2017, 6 pages.

* cited by examiner

Surveillance Video

Surveillance Video

Surveillance Video

METHOD AND A COMPUTING DEVICE FOR PROVIDING PRIVACY CONTROL IN A SURVEILLANCE VIDEO

TECHNICAL FIELD

The present disclosure relates in general to video surveillance. More particularly, but not exclusively, the present disclosure discloses a method and a computing device for providing privacy control in a surveillance video.

BACKGROUND

With the increase of threats and high level of criminality, security remains a major public concern worldwide. Surveillance is one approach to address this issue. Through video surveillance, the behavior, activities, or other changing information, usually of people are monitored but which is often considered as a violation of the privacy.

The privacy in the surveillance video is safeguarded typically by encrypting region(s) of interest (ROIs) at the video capturing device (alternatively referred as camera) end either before or during video encoding. There are several limitations in encrypting ROIs at the camera end. The limitations are reduction in compression ratio (or increase in compressed bit rate) due to loss in correlation of ROIs, reduction in decoded video quality when performing encryption during encoding, static and fixed options of ROIs, necessity of multiple encoded streams if different ROIs is needed at different destinations, which significantly increases the encoded streams bit rate and higher complexity and power consumption at the camera end for providing the privacy control.

Hence, due to reduction in the compression ratio and multiple encoded streams, the bandwidth requirement from the camera for transmitting the encoded streams significantly increases. This calls for high bandwidth connectivity from the camera to a central server and terminals, which is not always available. And, the reduction in decoded video quality leads to poor visual experience and may create difficulties in detecting the regions of interest. Further, due to static and fixed number of ROIs at the camera end, the privacy levels supported are limited and fixed. The camera has to generate a plurality of video streams for each user based on authentication level of each user. Due to which there exists a lot of complication at the camera end and the resource consumption or computation level increases exponentially.

Another drawback in the existing technique is that, since the camera identifies the ROIs, masks the identified ROIs and transmits the masked ROIs to the user, if in case the user wishes to have a different authentication level, it is not possible.

SUMMARY

The present disclosure relates to a method for providing privacy control in a surveillance video. The method comprises receiving a surveillance video from a video capturing device. The method further comprises receiving an authentication input key from a user of the computing device, wherein the authentication input key is indicative of a privacy level associated with the user. Based on the received authentication input key, the method comprises identifying one or more regions of interests (ROIs) in the surveillance video. Thereafter, the method comprises masking in real-time the identified one or more ROIs in the surveillance video for providing privacy control.

Further, the present disclosure relates to a computing device for providing privacy control in a surveillance video. The computing device comprises a processor and a memory, communicatively coupled to the processor, wherein the memory stores processor-executable instructions, which, on execution, causes the processor to receive a surveillance video from a video capturing device. The processor also receives an authentication input key from a user of the computing device, wherein the authentication input key is indicative of a privacy level associated with the user. The processor identifies the one or more regions of interests (ROIs) in the surveillance video based on the authentication input key. Further, the processor masks in real-time the identified one or more ROIs in the surveillance video for providing privacy control.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and about the accompanying figures, in which:

Figure 1:
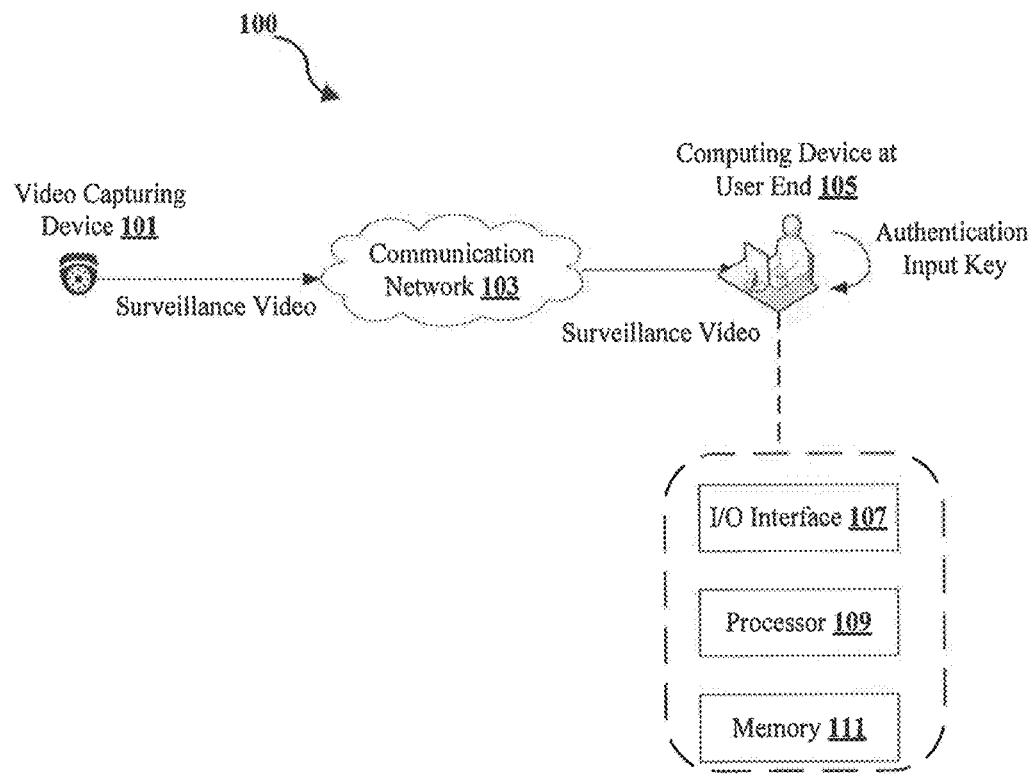
FIG. 1 shows an exemplary environment illustrating a computing device at user end for providing privacy control in a surveillance video.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a computing device for providing privacy control in a surveillance video. Contrary to the existing techniques, wherein the region of interest in the surveillance video is identified by a video capturing unit at the cost of extra bandwidth at the video capturing device, in the present invention, the region of interest in the video surveillance is identified by the computing device. In the present invention, the user provides an authentication input key to the computing device. Based on the authentication input key, the computing device identifies the privacy level for the user and based on the privacy level, the one or more region of interests is identified in the surveillance video.

Further, in the present disclosure once the ROIs are identified, the computing device implements a logic to mask the identified ROIs thereby providing the privacy control for the surveillance video.

In the present disclosure, the number of privacy levels achievable are unlimited and not fixed by region(s) of interest at the video capturing device. Due to this there is no need for any modification or complexity/power increase in the video capturing device end and doesn't demand for increase in bandwidth for transmitting the surveillance video. Also in the present disclosure, the video quality is not deteriorated while providing the privacy control as in the convention techniques as the encryption is not performed only on the selected regions of interest but on the entire image in the surveillance video.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment illustrating a computing device at user end for providing privacy control in a surveillance video.

The exemplary environment 100 comprises a video capturing device 101 and a computing device 105. The video capturing device 101 may include, but not limited to, a camera. The camera may be placed at one or more locations for surveillance wherein they are connected to a recording device or an Internet Protocol (IP) network. A user at the recording device may watch the recordings in the camera in real-time for surveillance. The video capturing device 101 may transmit the captured contents i.e. the surveillance video to the computing device 105 through a communication network 103. The communication network 103 may be a wired or a wireless communication network 103. The computing device 105 may include, but not limited to, a computer, a tablet, server, a mobile phone. Before transmitting the surveillance video, the video capturing device 101 encodes the surveillance video and thereafter encrypts the surveillance video. The surveillance video may be encoded using one or more methods such as H.264, Moving Picture Experts Group (MPEG)-4 Visicontrol Compressed Image (VCI) etc. The encoded surveillance video may be encrypted using one or more techniques such as Advanced Encryption Standard (AES), Data Encryption Standard (DES) etc.

The computing device 105 comprises an I/O interface 107, a processor 109 and a memory 111. The computing device 105 receives the encoded and encrypted surveillance video for surveillance through the I/O interface 107. The received surveillance video is stored in the memory 111. The processor 109 may be configured with the decoder and decryptor for decoding and decrypting the encoded and encrypted surveillance video respectively. The processor 109 decodes and decrypts the surveillance video using the one or more same standards used for encoding and encrypting the surveillance video.

The user at the computing device 105 may provide an authentication input key which indicates privacy level for the user. Based on the authentication input key the processor 109 identifies one or more regions of interests (ROIs) in the surveillance video. The ROIs may include, but not limited to, face of a person, vehicle number plates, name plates, ID badges, human body and any objects in the surveillance video. The identified ROIs may be masked by the processor 109 using one or more feature extraction and machine learning techniques thereby providing the privacy control in the surveillance video i.e. the user in the computing device 105 would be seeing the contents which are not masked and hence the privacy control is achieved in the surveillance video.

Figure 2:
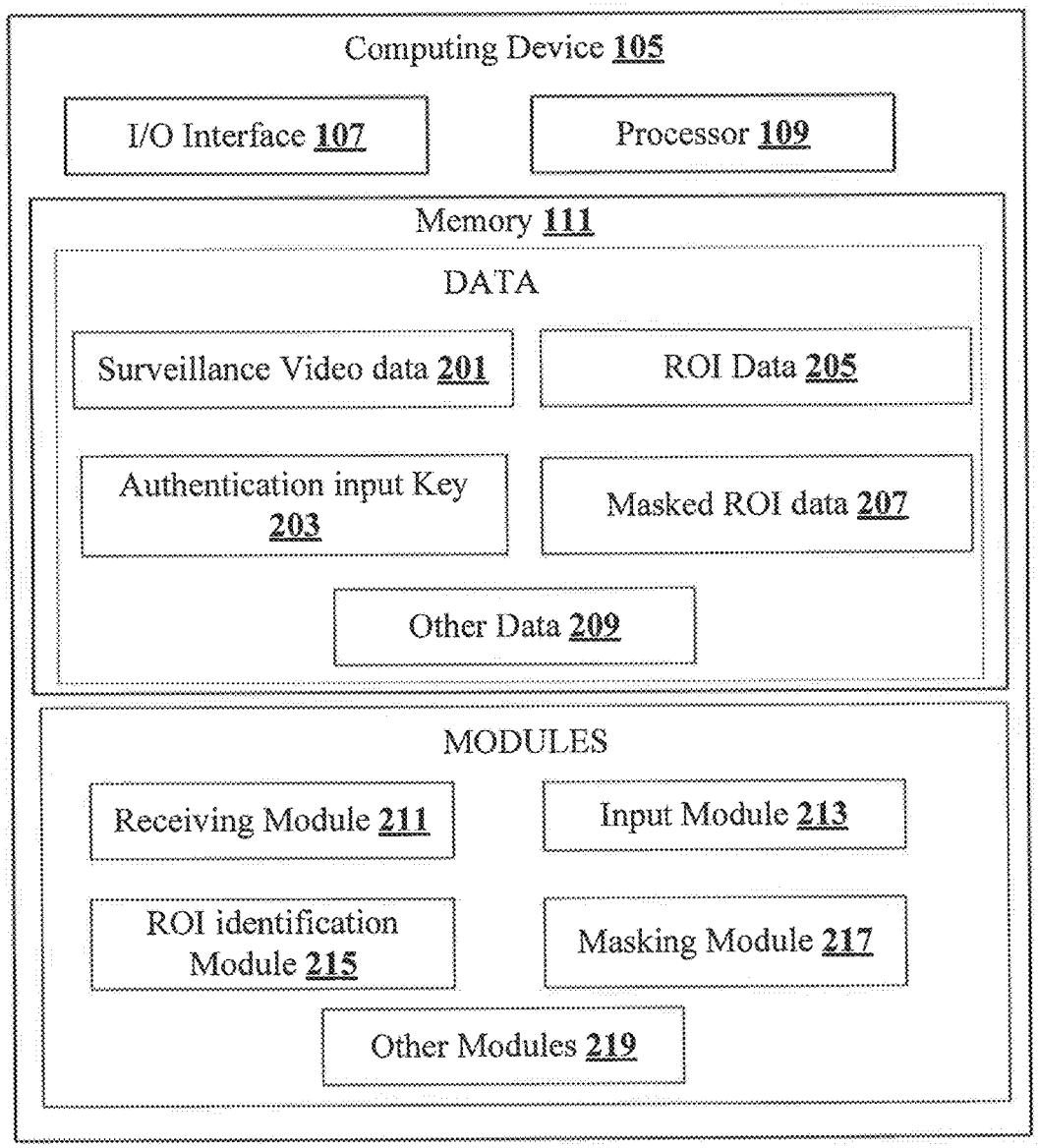
FIG. 2 shows a detailed block diagram illustrating the computing device in accordance with some embodiments of the present disclosure.

FIG. 2 shows a detailed block diagram illustrating the computing device in accordance with some embodiments of the present disclosure.

The computing device 105 comprises an I/O interface 107, a memory 111 and a processor 109. Memory 111 is communicatively coupled to the processor 109. The processor 109 is configured to perform one or more functions of the computing device 105 for providing privacy control in the surveillance video. In one implementation, the computing device 105 comprises data and modules for performing various operations in accordance with the embodiments of the present disclosure. In an embodiment, the data may include, without limitation, surveillance video data 201, authentication input key 203, ROI data 205, masked ROI data 207 and other data 209.

In one embodiment, the data may be stored within the memory 111 in the form of various data structures. Additionally, the aforementioned data can be organized using data models, such as relational or hierarchical data models. The other data 209 may store data, including temporary data and temporary files, generated by modules for performing the various functions of the computing device 105.

In an embodiment, the data may be processed by one or more modules. In one implementation, the one or more modules may also be stored as a part of the processor 109. In an example, the one or more modules may be communicatively coupled to the processor 109 for performing one or more functions of the computing device 105.

In one implementation, the one or more modules may include, without limitation, a receiving module 211, input module 213, ROI identification module 215, masking module 217 and other modules 219.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the receiving module 211 receives the surveillance video from the video capturing device 101. The surveillance video data 201 is stored in the memory 111. The information such as the date and time of receipt of the surveillance video is also stored in the memory 111.

In some embodiments, the input module 213 is used by the user to provide the authentication input key 203. The computing device 105 receives the authentication input key 203. The authentication input key 203 indicates the privacy level for the user. Each user may have a different privacy level associated for them. For example, the administrator may have a different privacy level compared to other users of the computing device 105. Based on the privacy level, the one or more ROIs are identified. In an embodiment, the authentication input key 203 is compared with a privacy limit level. Each computing device 105 is assigned with the pre-set privacy limit level which can't be exceed by the user. So, if the authentication input key 203 provided by the user is less than or equal to the privacy limit level of the computing device 105 then the one or more ROIs may be identified. If the authentication input key 203 is greater than the privacy limit level of the computing device 105 then the authentication input key 203 is replaced with the privacy limit level. The privacy limit level may be set by an administrator of the computing device 105.

In an embodiment, the ROI identification module 215 is used to identify the one or more regions of interest in the received surveillance video. The ROI identification module 215 matches the authentication input key 203 with plurality of predetermined authentication keys, wherein each of the plurality of predetermined authentication keys is associated with a different privacy level. As an example, the privacy level may range from $L_1$ to $L_n$, wherein $L_n$ is the highest level of authentication set for the user and $L_1$ is the lowest level of authentication set for the user. The user with $L_n$ privacy level is a secured user or an administrator and hence there may not be any regions from region 1 to region n in the surveillance video which needs to be identified for masking. On the contrary, for the user with L1 privacy level, there might be several regions in the surveillance video which needs to be masked. For each privacy level, the ROI identification module 215 identifies ROIs as shown in the below Table 1. In an embodiment, the ROI identification module 215 identifies the one or more ROIs in the surveillance video when the authentication input key 203 is less than or equal to the privacy limit level pre-set for the computing device 105. If the authentication input key 203 is greater than the privacy limit level pre-set for the computing device, then the ROI identification module 215 replaces the authentication input key 203 with the privacy limit level.

The identified ROIs in the surveillance video is also stored in the memory 111 as the ROI data 205.

TABLE 1

| Privacy Level | Regions of Interest | Comments |
| --- | --- | --- |
| Ln | None | Highest level of authentication |
| Ln-1 | Pre-determined sub-set of regions between 1 to n | |
| Ln-2 | Pre-determined sub-set of regions between 1 to n | |
| Ln-3 | Pre-determined sub-set of regions between 1 to n | |
| . | . | . |
| . | . | . |
| . | . | . |
| L1 | Regions 1 to n | Lowest level of authentication |

In an embodiment, the masking module 217 masks the identified ROIs in the surveillance video in real-time. The masking is performed to hide the image content in the identified ROIs from the user. Masking may be performed by replacing pixels in the identified ROIs with black pixel values or by pixelization. By pixelization, the identified ROIs are blurred at lower resolution. The masked ROIs are stored in the memory 111 as the masked ROI data 207.

Figure 3A:
FIGS. 3a-3c shows an exemplary surveillance video and the process of providing privacy control in the surveillance video in accordance with some embodiments of the present disclosure.
Figure 3B:
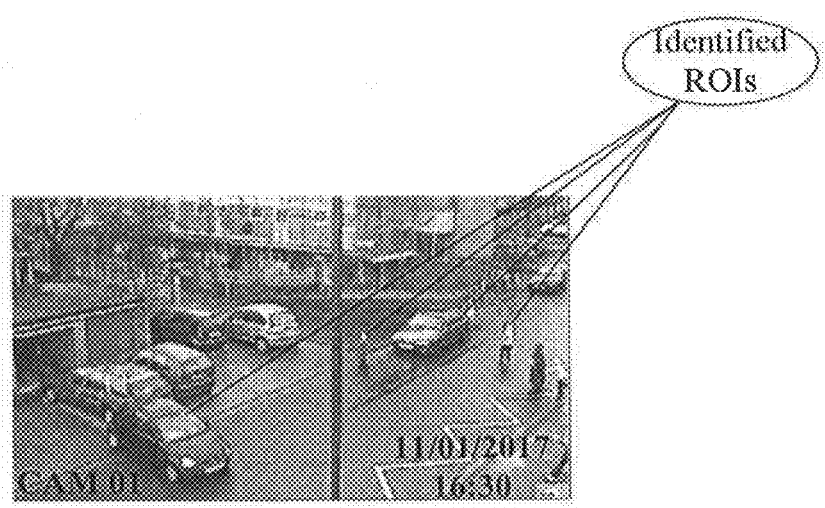
Figure 3C:
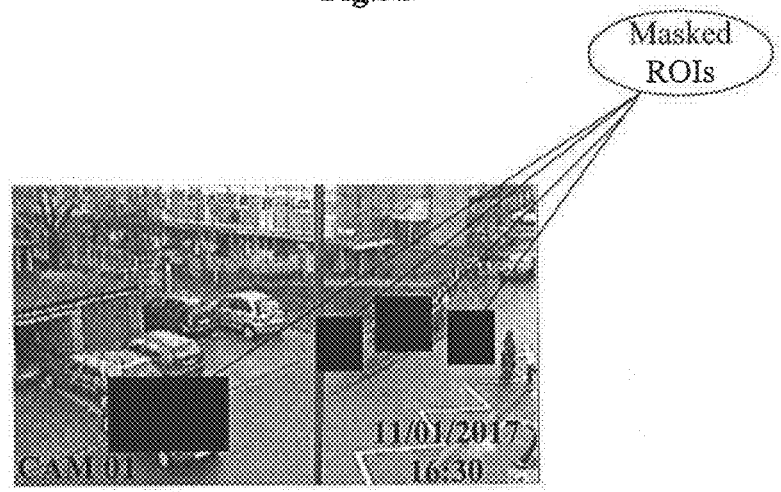

FIGS. 3a-3c shows an exemplary surveillance and the process of providing privacy control for the surveillance video in accordance with some embodiments of the present disclosure.

As an example, the computing device 105 receives a surveillance video from the video capturing device 101. The received surveillance video is as shown in FIG. 3a wherein the video frame shows few cars, a pole and few people in the frame. When the surveillance video is sent from the video capturing device 101, the entire content in the surveillance video is encoded and encrypted. When the computing device 105 receives the surveillance video, the processor 109 decodes and decrypts the content in the surveillance video. The computing device 105 receives user authentication key from the user of the computing device 105. As an example, the user authentication key may be a user ID number from the user. The user authentication key is compared with the plurality of predetermined authentication keys. Each predetermined authentication input key 203 is associated with a privacy level. As an example, the user authentication key matches with one of the predetermined authentication key which has a privacy level of L2. For L2 privacy level there would be predetermined sub-set of regions between 1 to n which needs to be masked as the user does not have authentication to view all the content in the received video surveillance. Hence, the one or more ROIs are identified based on the authentication input key. The one or more ROIs are identified since the authentication input key 203 is less than the privacy limit level pre-set for the computing device 105. The identified ROIs in the surveillance video based on the authentication input key 203 is as shown in FIG. 3b.

The identified regions are masked by the processor 109 by replacing all the pixels in the identified regions with black pixel values as shown in FIG. 3c. Therefore, the surveillance video which would be displayed to the user on a display unit is as shown in FIG. 3c wherein some regions of interest are hided to protect the privacy in the surveillance.

Figure 4:
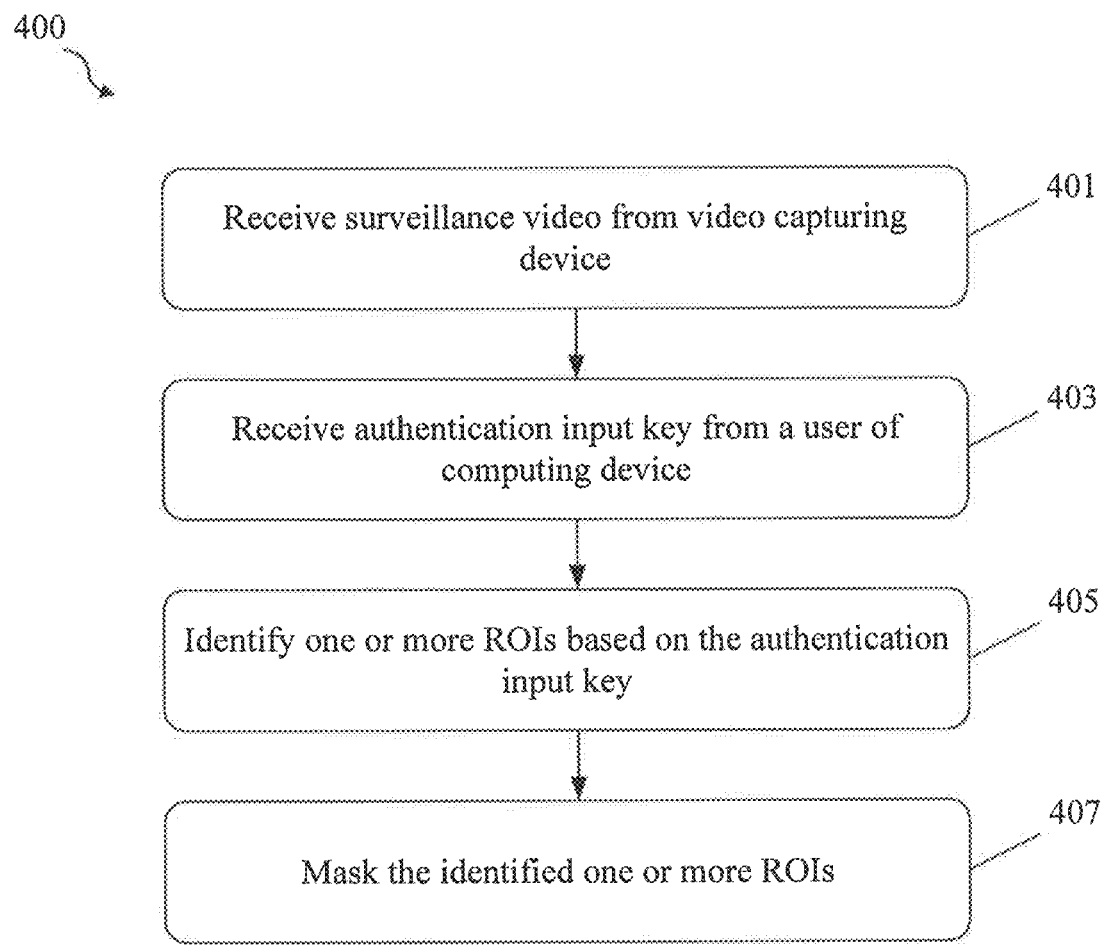
FIG. 4 shows a flowchart illustrating a method for providing privacy control in a surveillance video in accordance with some embodiments of the present disclosure.

FIG. 4 shows a flowchart illustrating a method for providing privacy control in a surveillance video in accordance with some embodiments of the present disclosure.

As illustrated in FIG. 4, the method comprises one or more blocks for providing a privacy control in a surveillance video using a computing device 105. The method may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the computing device 105 may receive surveillance video from a video capturing device 101.

At block 403, the computing device 105 may receive the authentication input key 203 from the user of the computing device 105. The user may be an administrator. The authentication input key 203 indicates privacy level of the user.

At block 405, the computing device 105 identifies one or more ROIs in the surveillance video based on the authentication input key 203. The authentication input key 203 provided by the user is matched with plurality of predetermined authentication input keys. Each predetermined authentication key is associated with a different privacy level. Once the privacy level is ascertained based on the match, the one or more regions of interest are identified.

At block 407, the computing device 105 masks the identified one or more ROIs. Masking is performed to hide the image content in the identified ROIs from the user. Masking may be performed by replacing pixels in the identified ROIs with black pixel values or by pixelization. By pixelization, the identified ROIs are blurred at lower resolution. The masked ROIs are stored in the memory 111 as the masked ROI data 207.

In an embodiment, the video surveillance with masked ROIs are displayed on a display unit of the computing device 105.

Computer System

Figure 5:
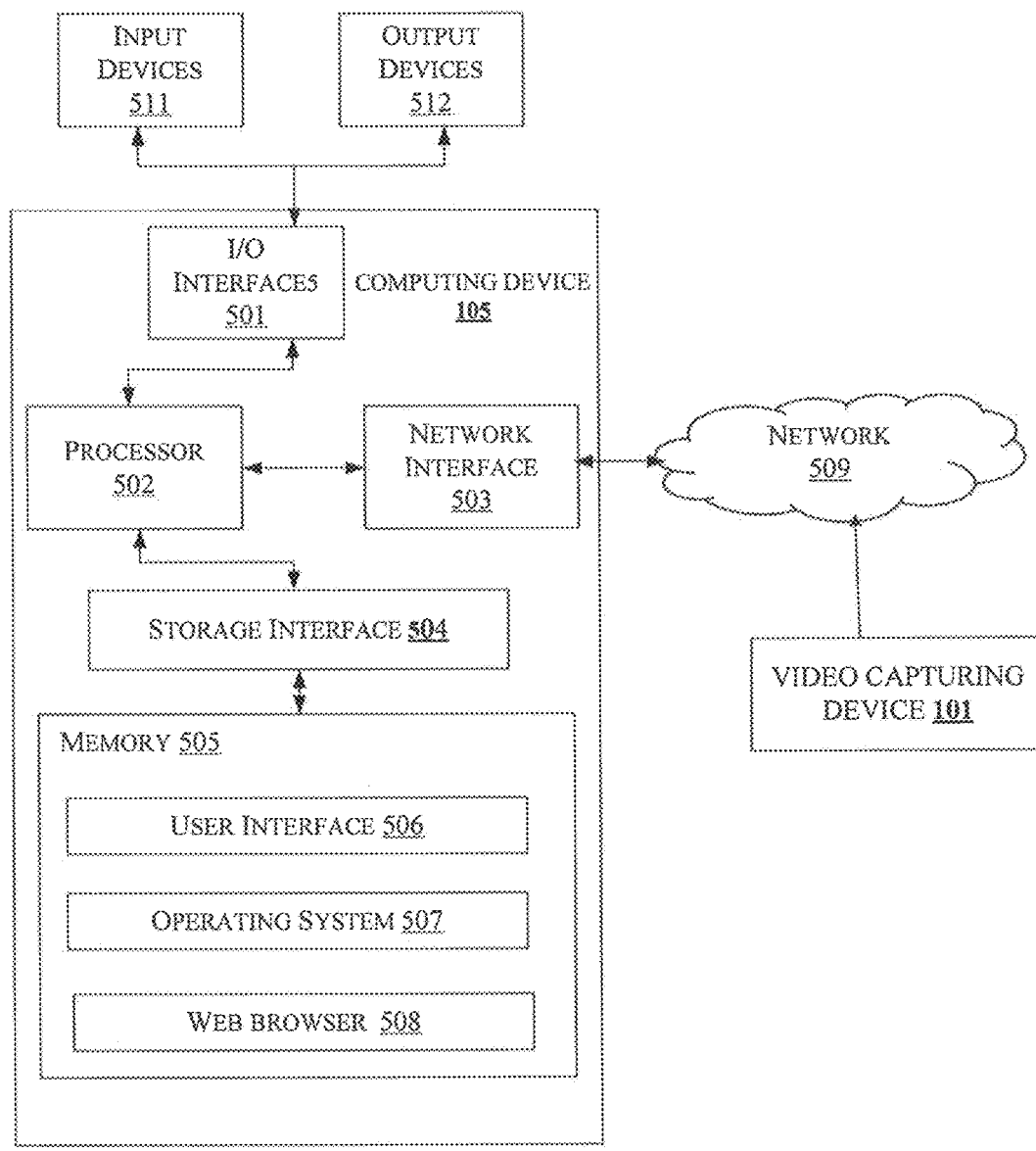
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 can be the computing device 105 which is used for providing privacy control in a surveillance video. The computer system 500 may comprise a central processing unit ("CPU" or "processor") 502. The processor 502 may comprise at least one data processor for executing program components for executing user- or system-generated business processes. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 501, the computer system 500 may communicate with one or more I/O devices (511 and 512).

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network 509 can be implemented as one of the different types of networks, such as intranet or Local Area Network (LAN) and such within the organization. The communication network 509 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application data 506, an operating system 507, web browser 508 etc. In some embodiments, computer system 500 may store user/application data 506, such as the data, variables, records, etc. as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. I/O interface 501 may facilitate display, execution, interaction, manipulation, or operation of program components through textual or graphical facilities. For example, I/O interface may provide computer interaction interface elements on a display system operatively connected to the computer system 500, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 500 may implement a web browser 508 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a method and a computing device for providing privacy control in a surveillance video.

In an embodiment, the present disclosure provides a dynamic and adaptive privacy control of regions of interest in surveillance video. Therefore, the number of privacy levels achievable are unlimited and not fixed by region(s) of interest at video capturing device (camera) end.

In an embodiment, in the present disclosure there is no need for any changes or complexity/power increase in the video capturing device end as the processing is not happening at the camera end and doesn't demand for increase in bandwidth in the camera end for transmitting the surveillance video due to increase the number of privacy levels. In the present disclosure, the processing i.e. identifying the ROIs and masking the ROIs are happening the computing device end.

In the present disclosure, the identification and masking of ROIs for different users happens at the computing device at the user end. If for different users the identification and masking of ROIs were to be implemented in the camera, then the camera has to generate a plurality of video streams for each user based on the authentication input key. This introduces lot of complication at the camera end as the resource/computation consumption has increased exponentially.

In the present disclosure, the video quality is not deteriorated while providing the privacy control as encryption is not performed on the region of interest but on the entire content in the surveillance video.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Video capturing Device |
| 103 | Communication Network |
| 105 | Computing Device |
| 107 | I/O Interface |
| 109 | Processor |
| 111 | Memory |
| 201 | Surveillance Video data |
| 203 | Authentication Input Key |
| 205 | ROI data |
| 207 | Masked ROI data |
| 209 | Other Data |
| 211 | Receiving Module |
| 213 | Input Module |
| 215 | ROI identification Module |
| 217 | Masking Module |
| 219 | Other Modules |

The invention claimed is:

1. A method for providing privacy control in a surveillance video, the method comprising:
receiving, by a computing device, a surveillance video from a video capturing device;
receiving, by the computing device, an authentication input key from a user of the computing device, wherein the authentication input key is indicative of a privacy level associated with the user, and wherein the authentication input key is replaced with a privacy limit level preset for the computing device when the authentication input key is greater than the privacy limit level;
identifying, by the computing device, one or more regions of interests (ROIs) in the surveillance video based on the received authentication input key; and
masking in real-time, by the computing device, the identified one or more ROIs in the surveillance video for providing privacy control.

2. The method as claimed in claim 1, wherein the surveillance video received by the computing device is encrypted and encoded.

3. The method as claimed in claim 1, wherein the surveillance video is decrypted and decoded by the computing device before identifying the one or more ROIs in the surveillance video.

4. The method as claimed in claim 1, wherein the masking of the identified one or more ROIs comprises at least one of replacing pixels in the identified one or more ROIs with black pixel values and blurring the pixels in the identified one or more ROIs.

5. The method as claimed in claim 1 further comprises displaying the surveillance video with the masked one or more ROIs on a display unit.

6. The method as claimed in claim 1, wherein the identifying the one or more ROIs in the surveillance video comprises:
matching the authentication input key with plurality of predetermined authentication keys, wherein each of the plurality of predetermined authentication key is associated with a different privacy level.

7. The method as claimed in claim 6, wherein the one or more ROIs in the surveillance video are identified when the authentication input key is less than or equal to the privacy limit level preset for the computing device.

8. A computing device for providing privacy control in a surveillance video, the computing device comprising:
a processor; and
a memory, communicatively coupled to the processor, wherein the memory stores processor-executable instructions, which, on execution, causes the processor to:
receive a surveillance video from a video capturing device;
receive an authentication input key from a user of the computing device, wherein the authentication input key is indicative of a privacy level associated with the user, and wherein the authentication input key is replaced with a privacy limit level preset for the computing device when the authentication input key is greater than the privacy limit level;
identify one or more regions of interests (ROIs) in the surveillance video based on the received authentication input key; and
mask in real-time the identified one or more ROIs in the surveillance video for providing privacy control.

9. The computing device as claimed in claim 8, wherein the surveillance video received by the computing device is encrypted and encoded.

10. The computing device as claimed in claim 8, wherein the processor decrypts and decodes the surveillance video before identifying the one or more ROIs in the surveillance video.

11. The computing device as claimed in claim 8, wherein the processor mask the identified one or more ROIs by at least one of replacing pixels in the identified one or more ROIs with black pixel values and blurring the pixels in the identified one or more ROIs.

12. The computing device as claimed in claim 8, wherein the processor displays surveillance video with masked one or more ROIs on a display unit.

13. The computing device as claimed in claim 8, wherein the processor identifies the one or more ROIs in the surveillance video by matching the authentication input key with plurality of predetermined authentication keys, wherein each of the plurality of predetermined authentication key is associated with a different privacy level.

14. The computing device as claimed in claim 13, wherein the processor identifies the one or more ROIs in the surveillance video when the authentication input key is less than or equal to privacy limit level preset for the computing device.

15. A non-transitory computer readable medium including instruction stored thereon that when processed by the at least one processor cause a computing device to perform operations comprising:
receiving a surveillance video from a video capturing device;
receiving an authentication input key from a user of the computing device, wherein the authentication input key is indicative of a privacy level associated with the user;
identifying one or more regions of interests (ROIs) in the surveillance video by matching the authentication input key with a plurality of predetermined authentication keys, wherein each of the plurality of predetermined authentication key is associated with a different privacy level, wherein identification of the one or more regions of interests (ROIs) in the surveillance video is performed when the authentication input key is less than or equal to a privacy limit level preset for the computing device, and wherein the authentication input key is replaced with the privacy limit level preset for the computing device when the authentication input key is greater than the privacy limit level; and masking in real-time the identified one or more ROIs in the surveillance video for providing privacy control.

16. The non-transitory computer readable medium as claimed in claim 15, wherein the surveillance video received by the computing device is encrypted and encoded.

17. The non-transitory computer readable medium as claimed in claim 15, wherein the surveillance video is decrypted and decoded by the computing device before identifying the one or more ROIs in the surveillance video.

18. The non-transitory computer readable medium as claimed in claim 15, wherein the masking of the identified one or more ROIs comprises at least one of replacing pixels in the identified one or more ROIs with black pixel values and blurring the pixels in the identified one or more ROIs.

19. The non-transitory computer readable medium as claimed in claim 15, further including instruction stored thereon that when processed by at least one processor cause a computing device to perform operation comprising:
   displaying the surveillance video with the masked one or more ROIs on a display unit.

* * * * *